United States Patent [19]

Laface et al.

[11] 4,115,664
[45] Sep. 19, 1978

[54] DISCRIMINATING NETWORK FOR TELEPHONE SWITCHING SIGNALS

[75] Inventors: Carmelo Laface, Milan; Carlo Vantellini, Varedo, both of Italy

[73] Assignee: Società Italiana Telecomunicazioni Siemens S.p.A., Milan, Italy

[21] Appl. No.: 784,673

[22] Filed: Apr. 5, 1977

[30] Foreign Application Priority Data

Apr. 6, 1976 [IT] Italy ................................. 21954 A/76

[51] Int. Cl.² .............................................. H04M 3/02
[52] U.S. Cl. ............................. 179/84 R; 179/18 HB
[58] Field of Search ................ 179/81 R, 81 A, 84 R, 179/84 A, 84 L, 18 HB, 18 FA, 18 F, 1 MN, 16 F

[56] References Cited

U.S. PATENT DOCUMENTS

| | | | |
|---|---|---|---|
| 3,757,052 | 9/1973 | Tothill | 179/16 F |
| 3,829,619 | 8/1974 | Close | 179/84 A |
| 3,838,223 | 9/1974 | Lee | 179/18 FA |
| 3,941,939 | 3/1976 | Holmes | 179/84 R |

*Primary Examiner*—Kathleen H. Claffy
*Assistant Examiner*—Joseph A. Popek
*Attorney, Agent, or Firm*—Karl F. Ross

[57] ABSTRACT

A network discriminating among switching signals appearing on a pair of talking wires of a telephone line comprises a light-emitting diode in series with each wire and a phototransistor illuminable thereby. The phototransistors energize respective amplifiers which work into a logic circuit distinguishing between current flow in one or both of these wires.

5 Claims, 1 Drawing Figure

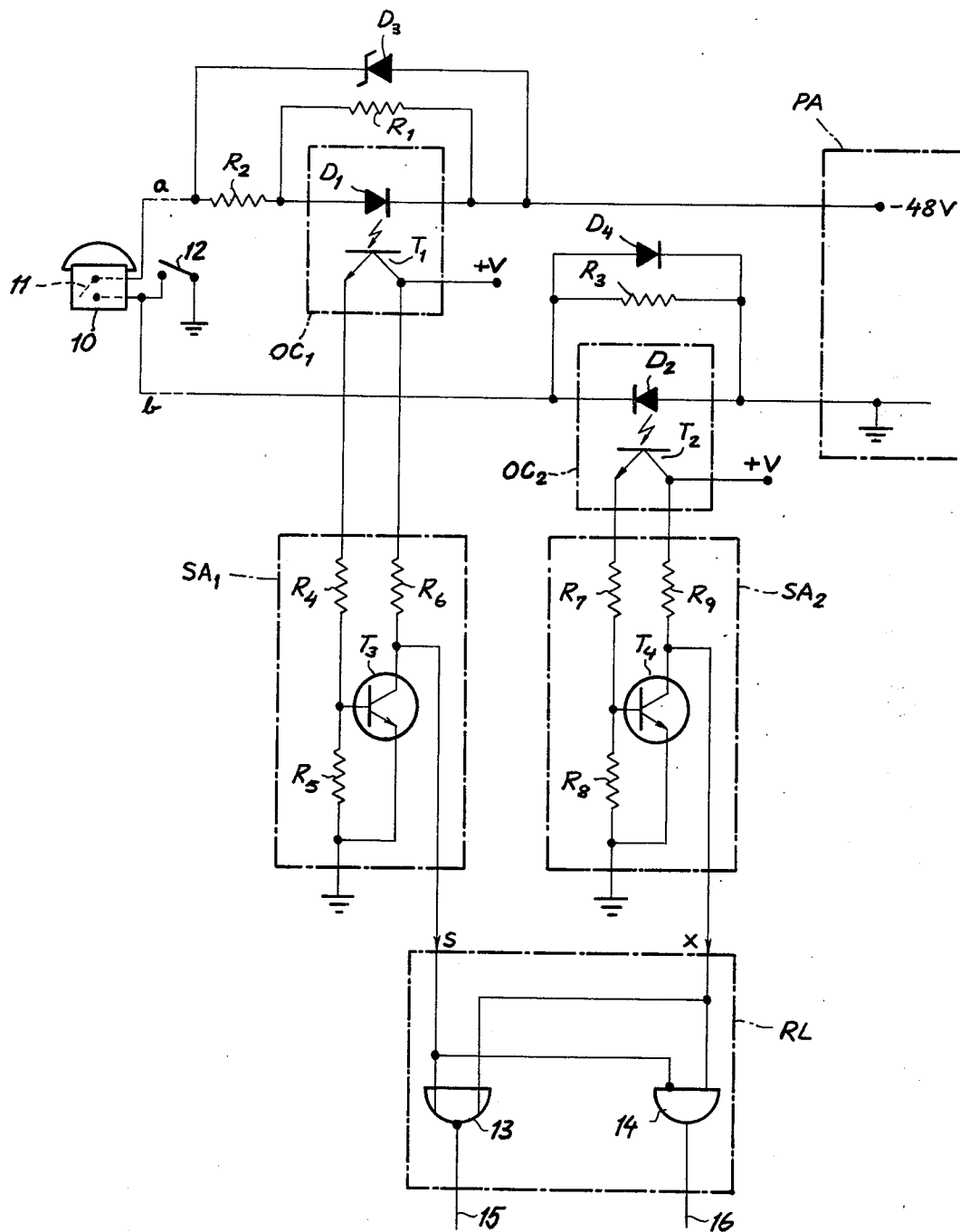

DISCRIMINATING NETWORK FOR TELEPHONE SWITCHING SIGNALS

FIELD OF THE INVENTION

Our present invention relates to a discriminating network for a telephone or other telecommunication system in which a pair of signal wires are energizable with direct current under the control of a subscriber at a remote station.

BACKGROUND OF THE INVENTION

Telephone exchages communicate with associated subscriber stations by way of pairs of talking wires to which the switching equipment of the exchange can be connected upon the initiation of a call by the subscriber, i.e. upon closure of a loop through the two wires with the aid of the usual hook switch. At the exchange the wires are tied to respective terminals of a source of direct current, one of which is usually grounded. Thus, an interconnection of the wires by the hook switch causes current to flow through both wires whereupon a line monitor responsive to such current flow generates an output indicative of this condition.

In certain instances, as where the subscriber station is equipped with a switchboard, that station may also have a key whose operation grounds one of the talking wires so that only the wire tied to the live terminal at the exchange will carry current. The line monitor should be capable in such cases to discriminate between two conditions, i.e. the flow of current through one or both wires.

Conventional line monitors, essentially comprising current/voltage converters working into associated logic circuits, are sensitive to spurious current pulses that happen to be accidentally induced in these signal wires whereby untimely switching operations may be started. There is also a danger of overvoltage which can damage the logic circuits and other components further downstream.

OBJECT OF THE INVENTION

The object of our present invention, therefore, is to provide an improved discriminating network for the purpose set forth which obviates the aforestated drawbacks.

SUMMARY OF THE INVENTION

We realize this object, in accordance with our present invention, by the use of a photoelectric coupler between at least one and preferably each signal wire and the associated logic network, this coupler comprising a light-emitting diode (LED) in series with the signal wire and a photon detector, such as a phototransistor, juxtaposed therewith as well as amplifier means connected to the photon detector for generating an output indicative of current flow in that wire.

Advantageously, each photoelectric coupler also includes circuitry for protecting the associated LED from overvoltage or reverse current as well as for limiting the sensitivity of the coupler in order to prevent its response to spurious signals, as more fully described hereinafter.

BRIEF DESCRIPTION OF THE DRAWING

The invention will now be described in detail with reference to the accompanying drawing the sole FIGURE of which is a circuit diagram of our improved discriminating network.

SPECIFIC DESCRIPTION

In the drawing we have shown a subscriber station 10 from which a pair of talking wires $a$ and $b$ extend to a source of direct current PA at a central office or exchange, this source comprising a negative terminal (here of $-48V$) tied to wire $a$ and a positive terminal (ground) tied to wire $b$. Subscriber station 10 includes a coventional hook switch 11, closable to interconnect the two wires $a$ and $b$, as well as a contact 12 termed a ground key whose operation grounds the wire B and thus prevents the flow of direct current in that wire upon closure of switch 11.

In accordance with our present invention, each of the two talking wires $a$, $b$ traverses a respective photoelectric coupler $OC_1$, $OC_2$ comprising two LEDs $D_1$ and $D_2$ in series with these wires. Each photodiode is juxtaposed with a respective phototransistor $T_1$, $T_2$ whose base intercepts photons emitted by the associated photodiode when the latter is traversed by a flow of direct current. The collectors of phototransistors $T_1$ and $T_2$ are connected to a point of positive potential $+V$ and, by way of respective resistors $R_6$ and $R_9$, to the collectors of a pair of NPN transistors $T_3$ and $T_4$ forming part of a pair of amplifiers $SA_1$, $SA_2$. The emitters of phototransistors $T_1$ and $T_2$ are grounded within the associated amplifiers by way of respective voltage dividers $R_4$, $R_5$ and $R_7$, $R_8$ whose junctions are tied to the bases of transistors $T_3$ and $T_4$, the emitters of these latter transistors being grounded. Amplifiers $SA_1$ and $SA_2$ have output leads S and X tied to the respective collectors. Upon closure of the line loop $a$, $b$ by the hook switch 11, the two LEDs lie in cascade with each other so as to be passed by the line current flowing — with ground key 12 unoperated — from ground at source PA to its negative terminal.

As long as the two LEDs $D_1$ and $D_2$ do not conduct, phototransistors $T_1$ and $T_2$ are blocked and the collectors of amplifying transistors $T_3$ and $T_4$ carry the high voltage $+V$ also appearing on leads S and X. If either of the LEDs is traversed by a current, the resulting conduction of transistor $T_3$ or $T_4$ reduces the potential of lead S or X to a low value. A logic circuit RL connected to these two leads distinguishes between low voltage on both leads S and X, indicative of simple closure of hook switch 11, and low voltage on lead S alone, indicative of the closure of that hook switch coupled with the grounding of wire $b$ by key 12. For this purpose, leads S and X are shown connected within circuit RL to respective inputs of a NOR gate 13 having an output 15 whose energization reveals the initiation of a call by the subscriber at station 10; AND gate 14, with an inverting input tied to lead S and a noninverting input tied to lead X, energizes its output 16 when the initiation of the call is accompanied by an operation of ground key 12. Outputs 15 and 16 extend to nonillustrated switching equipment within the exchange responding, in the conventional manner, to the conditions represented by the combination of binary output voltages on these outputs.

Each LED $D_1$, $D_2$ is shunted by a respective resistor $R_1$, $R_3$ limiting the sensitivty of the corresponding coupler.

A protective resistor $R_2$ is inserted in wire $a$, in series with LED $D_1$ (and therefore also with resistor $R_1$), the series combination of LED $D_1$ and protective resistor $R_2$ being bridged by a reverse-connected Zener diode $D_3$. Thus, if an overvoltage on wire $a$ generates an excessive current flow, Zener diode $D_3$ breaks down and prevents the current from passing through the photodiode.

A protective diode $D_4$ shunts the LED $D_2$ (and therefore also its sensitivity-limiting resistor $R_3$) to prevent reverse currents from passing through that LED in the event that positive voltage should appear for any reason on wire $b$.

We claim:

1. In a telephone system wherein a central office is linked with a subscriber station by a line including a first and a second signal wire, said first signal wire being connected at the central office to a source of d-c voltage, said second signal wire being grounded at the central office, said subscriber station being provided with a hook switch for interconnecting said first and second signal wires to form a closed loop traversed by direct current from said source, said subscriber station being further provided with a key for selectively grounding said second signal wire whereby current passes only through said first signal wire upon closure of said hook switch, the combination therewith of a discriminating network comprising:

a first light-emitting diode in series with said first signal wire;

a second light-emitting diode in series with said second signal wire, said light-emitting diodes being cascaded in said loop for traverse by the same current from said source upon closure of said hook switch with said key unoperated;

a first photon detector juxtaposed with said first light-emitting diode;

a second photon detector juxtaposed with said second light-emitting diode;

first and second amplifier means respectively connected to said first and second photon detectors for generating an ouput voltage indicative of current flow in the corresponding signal wire; and a logic circuit connected to both said amplifier means for distinguishing between current flow in both signal wires and current flow in said first signal wire only.

2. The combination defined in claim 1 wherein said photon detectors are phototransistors.

3. The combination defined in claim 1, further comprising a sensitivity-limiting resistor connected across each of said light-emitting diodes.

4. The combination defined in claim 3, further comprising a protective diode connected with reverse polarity across said second light-emitting diode.

5. The combination defined in claim 3, further comprising a protective resistor inserted in said first signal wire in series with said first light-emitting diode and a Zener diode reverse-connected across the series combination of said protective resistor and said first light-emitting diode.

* * * * *